United States Patent
Fitt

(10) Patent No.: US 12,333,649 B2
(45) Date of Patent: Jun. 17, 2025

(54) METHOD OF BOUNDING SPATIAL DATA UTILIZING THREE-DIMENSIONAL AXIS-ALIGNED BOUNDING BOXES

(71) Applicant: Siemens Industry Software Inc., Plano, TX (US)

(72) Inventor: Andrew Fitt, Cambridge (GB)

(73) Assignee: Siemens Industry Software Inc., Plano, TX (US)

( * ) Notice: Subject to any disclaimer, the term of this patent is extended or adjusted under 35 U.S.C. 154(b) by 137 days.

(21) Appl. No.: 18/022,251

(22) PCT Filed: Aug. 31, 2020

(86) PCT No.: PCT/US2020/048724
§ 371 (c)(1),
(2) Date: Feb. 20, 2023

(87) PCT Pub. No.: WO2022/046102
PCT Pub. Date: Mar. 3, 2022

(65) Prior Publication Data
US 2023/0334779 A1    Oct. 19, 2023

(51) Int. Cl.
*G06T 17/10*    (2006.01)
*G06F 30/10*    (2020.01)

(52) U.S. Cl.
CPC .............. *G06T 17/10* (2013.01); *G06F 30/10* (2020.01); *G06T 2210/12* (2013.01)

(58) Field of Classification Search
CPC ... G06T 17/10; G06T 2210/12; G06T 17/005; G06F 30/10; G06F 16/29; G06F 16/9027; G06F 2111/20
See application file for complete search history.

(56) References Cited

U.S. PATENT DOCUMENTS

| | | | | |
|---|---|---|---|---|
| 7,069,272 B2* | 6/2006 | Snyder | .................. | G06F 16/284 707/999.102 |
| 2010/0057407 A1* | 3/2010 | Fitt | ......................... | G06F 16/29 707/E17.014 |
| 2010/0057729 A1 | 3/2010 | Fitt | | |
| 2014/0081985 A1* | 3/2014 | Bentley | .................... | G06F 16/00 707/743 |
| 2014/0285488 A1* | 9/2014 | Sevastiyanov | ........ | G06T 17/005 345/426 |
| 2015/0324399 A1* | 11/2015 | Tyercha | .................. | G06F 16/29 707/792 |

FOREIGN PATENT DOCUMENTS

| | | | | |
|---|---|---|---|---|
| CA | 2826533 A1 | * | 3/2015 | ............. B65G 47/54 |
| CN | 104641373 A | | 5/2015 | |
| CN | 104766371 A | * | 7/2015 | |
| CN | 110597935 A | | 12/2019 | |
| EP | 2008249 A2 | | 12/2008 | |

OTHER PUBLICATIONS

International Search Report and Written Opinion for International App. PCT/US2020/048724 mailed May 27, 2021.
Klimaszewski, Kris, and Thomas W. Sederberg. "Faster ray tracing using adaptive grids." IEEE Computer Graphics and Applications 17.1 (1997): 42-51.

* cited by examiner

*Primary Examiner* — Maurice L. McDowell, Jr.
(74) *Attorney, Agent, or Firm* — Lempia Summerfield Katz LLC

(57) ABSTRACT

A computer implemented method of bounding spatial data associated with the geometric bounds of an item mapped into one or more 3-D axis-aligned bounding boxes is disclosed. The geometric bounds bound each permutation of all possible positions of the item geometrically. The method includes: partitioning a set of bounding boxes using a first group of intervals along the x axis direction and allocating a partition identification xpar; partitioning the set of bounding boxes using a second group of intervals along the y axis direction and allocating a partition identification ypar; partitioning the set of bounding boxes using a third group of intervals along the z axis direction and allocating a partition identification zpar; and partitioning the set of bounding boxes by partition identification tuples (xpar, ypar, zpar). The method further includes merging bounding boxes with the same partition identification tuple.

15 Claims, No Drawings

METHOD OF BOUNDING SPATIAL DATA UTILIZING THREE-DIMENSIONAL AXIS-ALIGNED BOUNDING BOXES

The present patent document is a § 371 nationalization of PCT Application Serial No. PCT/US2020/048724, filed Aug. 31, 2020, designating the United States, which is hereby incorporated by reference.

TECHNICAL FIELD

The present disclosure relates to a computer-implemented method of bounding spatial data associated with geometric bounds of an item mapped into one or more three-dimensional (3-D) axis-aligned bounding boxes, in particular where the geometric bounds bound each permutation of all possible positions of the item geometrically.

BACKGROUND

Computer Aided Design (CAD) tools are used frequently in the manufacture of complex products. Such products may be represented within the software as a hierarchical product structure, e.g., displayed in the form of a product tree. This allows a user to interrogate the product structure in a simple manner to view or edit the components and component assemblies stored within the product structure. Over time, these components and components assemblies will undergo a number of revisions, which require configuring to produce a buildable product. For example, in automotive manufacture, a wheel requires several wheel bolts to be affixed to an axle, the wheel itself may be a front, rear, left, or right wheel, the axle will be mounted onto the chassis, the chassis linked to a vehicle model, and so on. This represents a fairly short product tree between the root (e.g., the vehicle) and the final item (e.g., a wheel bolt), but for a fully configured, buildable product, each wheel bolt requires its own branch in the product structure tree. The resulting configured product may be sizeable as each branch is configured whether it is displayed to a user or not.

In order to modify, manipulate, or make choices about the root product, (e.g., the vehicle), a user needs to be able to search for occurrences of components and component assemblies, individual components, or revisions of components within the product structure. Searching and configuring such a product structure may be slow, depending on the volume of data involved, and may be improved by using a cache of the configured product and its explosion into occurrences of components and component assemblies. However, a caching approach for such configured products has a number of disadvantages. Firstly, each individual configuration of the product requires a separate cache. Each cache needs to be stored and kept up-to-date. Secondly, change management processes lead to change-specific, user-specific, and group-specific configurations of a product. This increases the number of caches required. Lastly, historical configurations also require a separate cache for each history point, no matter how few or many revisions are made. This increases the number of caches required yet further. Alternative approaches include techniques such as database indexing of paths through the product structure, which whilst an improvement on caching approaches, work well for short time periods. Longer time periods are likely to result in an explosion of paths due to revisions of components and component assemblies. This may be limited by indexing recent changes over a short timeframe, but this may not be practical or desirable for the user.

One solution to this issue is to use an unconfigured product-structure index. As the name implies, this is an index that rather than storing a fully configured product and the many combinations of parts, assemblies, and sub-assemblies required to build the product, the structure is stored using item paths. When a part is repeated in an assembly, for example, five-wheel nuts in a wheel, only a single item path needs to be stored, compared with five separate wheel nut entries in a conventional product index. This simplifies the indexing considerably. However, in some instances, whilst the actual part may be the same, the position of the part may differ in the same product. Taking the wheel nut example, each nut is positioned in a different location on a wheel hub. To reflect this, the unconfigured product structure index may store the unconfigured geometric bounds associated with an item path as one or more 3-D axis-aligned bounding boxes. This enables the index to support spatial queries. The geometric bounds bound each permutation of all possible positions of the part geometrically, including: changes to the geometric bounds of a part over part revisions; different positioning transforms for each instance of a part in an assembly; different positioning transforms for each instance of an assembly in a parent assembly; or changes to positioning transforms over assembly revisions.

Storing a full permutation may take up a large amount of storage space and/or require a long query time, even when exact duplicates have been removed. Small variations in the numerical values of the geometric bounds of a part and/or assembly positioning transforms are expected within a product, both in general and over a number of revisions, for example, as a part is made stronger or lighter. Small changes may also occur in positioning transforms over the assembly lifecycle, due, for example, to numerical rounding or part tolerances. Permutations of these differences may lead to many similar, overlapping geometric bounds. Whilst in the examples above the geometric bounds are unconfigured, that is, not yet configured along with a part into a specific assembly or product, a similar issue arises for configured geometric bounds. Given the number of configured geometric bounds associated with a configured product index, for example, long query times and large storage requirements are to be expected, again because a full permutation of all geometric bounds is stored.

Whilst a simple solution is to bound the full permutation with a single bound, because this is easily implemented and compact in terms of storage, it leads to too many false positives when querying the index. Some index entries may have many different positions, because a small part may be used in many, widely separated locations, such as in the wheel bolt example given above. There is therefore a need to be able to avoid the occurrence of so many false positives, whilst maintaining an easily implemented and efficiently stored solution.

SUMMARY

The present disclosure aims to address these issues by providing, in a first aspect, a computer implemented method of bounding spatial data associated with the geometric bounds of an item mapped into one or more 3-D axis-aligned bounding boxes, the geometric bounds bounding each permutation of all possible positions of the item geometrically. The method includes: partitioning a set of bounding boxes using a first group of intervals along the x axis direction and allocating a partition identification xpar; partitioning the set of bounding boxes using a second group of intervals along the y axis direction and allocating a partition identification ypar; partitioning the set of bounding boxes using a third group of intervals along the z axis direction and allocating a partition identification zpar; and partitioning the set of bounding boxes by partition identification tuples (xpar, ypar, zpar).

In another aspect, a computer program comprising instructions, which, when the computer program is executed by a computer, causes the computer to: partition a set of bounding boxes using a first group of intervals along an x-axis direction and allocating a partition identification xpar; partition the set of bounding boxes using a second group of intervals along a y-axis direction and allocating a partition identification ypar; partition the set of bounding boxes using a third group of intervals along a z-axis direction and allocating a partition identification zpar; and partition the set of bounding boxes by partition identification tuples (xpar, ypar, zpar).

In yet another aspect, a data processing apparatus includes a processor configured to: partition a set of bounding boxes using a first group of intervals along an x-axis direction and allocating a partition identification xpar; partition the set of bounding boxes using a second group of intervals along a y-axis direction and allocating a partition identification ypar; partition the set of bounding boxes using a third group of intervals along a z-axis direction and allocating a partition identification zpar; and partition the set of bounding boxes by partition identification tuples (xpar, ypar, zpar).

The scope of the present disclosure is defined solely by the appended claims and is not affected to any degree by the statements within this summary. The present embodiments may obviate one or more of the drawbacks or limitations in the related art.

DETAILED DESCRIPTION

Embodiments of the present disclosure offer the advantage that the geometric bounds are preserved without the need to store a full permutation, thus reducing false positives from spatial queries whilst maintaining reduced storage and faster query times. Each of the sorting processes associated with the embodiments take a time proportional to $n \cdot \log(n)$ for large n, where n is the number of items being sorted.

The method may further include identifying any group of bounding boxes in the set having the same partition identification tuple and merging the bounding boxes in the group.

Each bounding box may be in the format [xmin, ymin, zmin; xmax, ymax, zmax], such that a geometric point [x, y, z] lies within or on the boundary of the box when $xmin \leq x \leq xmax$, $ymin \leq y \leq ymax$ and $zmin \leq z \leq zmax$.

Partitioning the bounding boxes along the x-, y- or z-axis directions may include: projecting each bounding box in the set onto the axis direction to form a 1-D interval from the 3-D bounding box; sorting the 1-D intervals either by ascending value of xmin, ymin or zmin or descending value of xmax, ymax, zmax; and scanning the 1-D intervals in ascending or descending order and assign a partition identification xpar, ypar or zpar, respectively, to each 1-D interval.

Partitioning the set of bounding boxes by partition identification tuples (xpar, ypar, zpar) may further include sorting the partition identification tuples into lexicographical order.

The merged axis-aligned bounding boxes may be axis-aligned minimum bounding boxes. The axis aligned minimum bounding boxes may contain the minimum value of each of xmin, ymin, zmin, and the maximum value of each of xmax, ymax and zmax of the bounding boxes forming the group of bounding boxes having the same partition identification tuple.

The method may further include additionally partitioning the set of bounding boxes using the same or different groups of intervals before allocating a partition identification tuple. In this situation, the additional partitioning may be repeated until a pre-determined end point is reached. The pre-determined end point may either be a set of space or time indexing goals or that only a single bounding box remains within the group. Alternatively, prior to partitioning the bounding boxes, the intervals may be modified to increase or decrease the number of bounding boxes having the same partition identification tuple. In this situation, the intervals may be expanded, contracted, or transformed.

The geometric bounds may be unconfigured. In this case, the spatial data may be associated with item paths for entries in an unconfigured product index.

The present disclosure also provides, in a second aspect, a computer program including instructions, which, when the program is executed by a computer, causes the computer to carry out the acts of the method.

The present disclosure also provides, in a third aspect, a data processing apparatus including a processor adapted to perform the acts of the method.

The present disclosure is now described by way of example only. The present disclosure takes the approach of using a partitioning technique, (e.g., coupled with a merging act), to provide a computer implemented method of bounding spatial data associated with the geometric bounds of an item. Such geometric bounds are mapped into one or more 3-D axis-aligned bounding boxes and bound each permutation of all possible positions of the item geometrically.

Firstly, a partitioning a set of bounding boxes using a first group of intervals along the x axis direction and allocating a partition identification xpar is carried out. Next, a partitioning the set of bounding boxes using a second group of intervals along the y axis direction and allocating a partition identification ypar takes place. Then, a partitioning the set of bounding boxes using a third group of intervals along the z axis direction and allocating a partition identification zpar is carried out. Finally, a partitioning the set of bounding boxes by partition identification tuples (xpar, ypar, zpar) occurs. If the partitioning is being coupled with a merging act, then identifying any group of bounding boxes in the set having the same partition identification tuple and merging the bounding boxes in the group takes place. This is of primary use where the geometric bounds are unconfigured, and in creating an unconfigured product structure index. Omitting the merging act is of primary use in checking an unconfigured product structure index. The bounding boxes themselves are in the format [xmin, ymin, zmin; xmax, ymax, zmax], such that a geometric point [x, y, z] lies within or on the boundary of the box when $xmin \leq x \leq xmax$, $ymin \leq y \leq ymax$ and $zmin \leq z \leq zmax$. The basis of the present disclosure is to remove the need to store all permutations of the geometric bounds, and therefore although the examples given below are in relation to unconfigured geometric bounds, the principles of partitioning and merging bounding boxes still apply.

Intervals and Interval Partitioning

Firstly, embodiments of the present disclosure require the partitioning of a set of bounding boxes along a given axis direction. To do this, the initial act is to project the bounding box onto the axis direction in order to form a 1-D interval from the 3-D bounding box. For a bounding box [xmin, ymin, zmin; xmax, ymax, zmax], the x interval will be

[xmin, xmax], the y interval will be [ymin, ymax] and the z interval [zmin, zmax]. Taking as an example the bounding box:

[0, 0, 0, 10, 3, 1]

When projected onto the x axis direction gives [0, 10], the y axis direction gives [0, 3] and the z axis direction gives [0, 1]. Once the projection has been done, it is necessary to sort the 1-D intervals [min, max] into a chosen order. In this example, the 1-D intervals are sorted into ascending order of min, however it also possible in certain examples to sort the 1-D intervals in to descending order of max. Taking the example of the following intervals:

[5, 6], [0, 1], [10, 11], [5, 7]

these have a possible order of:

[0, 1], [5, 7], [5, 6], [10, 11]

wherein the relative ordering of the equal minimum intervals, [5, 6] and [5, 7] is not critical, because this does not affect the end points of the order.

Equally, had it been desirable to order the intervals in descending maxima, this would result in an order of:

[10, 11], [5, 7], [5, 6], [0, 1]

Once sorting has been completed, the next stage is to scan the 1-D intervals, in ascending (or descending, as applicable) order, and assign integer partition identifications. Here, overlapping intervals will have the same identification. Again, using the ordering based on ascending minimum, the scanning process requires iterating through the 1-D intervals in the sorted order, and tracking the "high-water mark" of the maximum, corresponding to the maximum value of max. So, starting from the sorted list:

[0, 1], [5, 7], [5, 6], [10, 11]

The first interval (having the lowest value of min) is [0, 1]. This is assigned a partition identification xpar of 0, and the high-water mark is 1. The next interval is [5, 7], which is above the high-water mark of 1, and therefore is allocated a new partition identification of 1. The new high-water mark is 7. The next interval is [5, 6], which is not above the high-water mark, (as 6 is less than 7) and so is also allocated the partition identification 1. Finally, the interval [10, 11] is above the high-water mark of 7, and so is allocated a new partition identification, 2, and a new high-water mark of 11 is set.

In effect, the sorted intervals are scanned to determine a gap, and whenever a gap is found a new partition is started. This is the same if the converse method of using descending values of max to order the intervals is used, then a low-water mark (the lowest value of min) is used to allocate the partition identification.

This process is repeated for both the y axis and the z axis, leading to values for xpar, ypar and zpar being allocated. Each bounding box is therefore represented by a partition identification tuple [xpar, ypar, zpar].

Partitioning Using an Irregular Grid

The next act in the method, once the partition identifications have been allocated and the bounding boxes are represented by partition identification tuples, it is necessary to partition the bounding boxes by the partition identification tuple. As an example, the three bounding boxes are:

[0, 0, 0, 10, 10, 10]
[5, 15, 0, 15, 25, 10]
[5, 0, 0, 15, 10, 10]

having x partition identifications xpar: 0, 0 and 0; y partition identifications ypar: 0, 1, 0; and z partition identifications zpar: 0, 0 and 0. This results in the following partition identifications:

xpar: 0 0 0
ypar: 0 1 0
zpar: 0 0 0 and, therefore, the following partition identification tuples:

(0, 0, 0)
(0, 1, 0)
(0, 0, 0)

These partition identification tuples are then sorted in a lexicographical order in order to group identical tuples together: i) and iii) together, ii) alone. The choice of sort condition is not important as long as the sort condition is consistent. For example, we could sort by xpar, then ypar for equal xpar, and then zpar for equal xpar and ypar. This groups equal (xpar, ypar, zpar) values together. Using an irregular grid approach effectively results in an irregular-sized grid is formed around the bounding boxes, such that each plane in the grid touches at least one bounding box but does not intersect with any of the bounding boxes. Each bounding box occupies exactly one grid cell, and each occupied cell has a partition identification tuple label (xpar, ypar, zpar). An individual interval scan is therefore equivalent to scanning a plan in each of the x, y and z axis directions.

Merging Bounding Boxes

Up to this point, the method is suitable for sorting through unconfigured product structure indexes in order to check whether certain bounding boxes are present in the index. However, to create the unconfigured spatial bounds element of an unconfigured product structure index, the next stage is to merge bounding boxes sharing the same partition identification tuple. Taking the boxes i), ii), and iii) above, for the partition identification tuple (0, 0, 0), boxes i) and iii) are merged. Merging bounding boxes sitting in the grid cell. This is done by creating the axis-aligned minimum bounding box, where the axis aligned minimum bounding boxes contain the minimum value of each of xmin, ymin, zmin, and the maximum value of each of xmax, ymax and zmax of the bounding boxes forming the group of bounding boxes having the same partition identification tuple. For bounding boxes i) and iii) above, this results in a single bounding box:

[0, 0, 0, 15, 10, 10]

No other bounding box shared the partition identification tuple of box ii), so this remains the same.

Repeated Partitioning of Bounding Boxes

In some circumstances, it may be desirable to repeat the partitioning of groups of bounding boxes, as a single partitioning act may result in a large group of bounding boxes sharing the same partition identification tuple. Smaller groups of bounding boxes may reveal differing merging options to a larger group, therefore carrying out a partitioning process until a pre-determined endpoint is reached may be performed in certain examples. The pre-determined end point is either a set of space or time indexing goals or that only a single bounding box remains within the group. Effectively this results in re-partitioning the set of bounding boxes using the same or different groups of intervals before allocating a partition identification tuple. For example, the bounding boxes:

[0, 0, 0, 1, 1, 1]
[2, 0, 0, 3, 1, 1]
[0, 2, 0, 3, 3, 1]

Group as follows:

Partition identification tuple (0, 0, 0)—bounding boxes iv) and v)

Partition identification tuple (0, 1, 0)—bounding box vi)

Taking the first partition and re-partitioning results in a sub-partition identification tuple of (0, 0, 0) for box iv), and a sub-partition identification tuple of (1, 0, 0) for box v). Re-partitioning results in the intervals [0, 1], [0, 1] and [0, 1] for box iv) along x, y and z, respectively, and [2, 3], [0, 1] and [0, 1] for box v) along x, y and z, respectively. Carrying out the ordering process described above and allocating sub-partitioning identifications in the same way reveals the sub-partition identification tuples.

Adjacent and Nearby Bounding Boxes

When carrying out part rotations during designing a product, the required transform may not preserve the axis-aligned nature of the original bounding box, or there may be floating point rounding errors, geometric tolerances, and positioning tolerances inherent in the product, resulting in bounding box expansion. This means that two adjacent bounding boxes may not be exactly adjacent. To cope with this, and to provide that bounding boxes may be merged successfully, the intervals may be modified to increase or decrease the number of bounding boxes having the same partition identification tuple. This may be by the intervals being expanded, contracted, or transformed. For example, take the two bounding boxes:

[1, 1, 1, 1.99999999, 2, 2]
[2, 1, 1, 3, 2, 2]

In this example, a small (0.00000001) gap is between them in the x axis direction. Partitioning slightly different bounding boxes to the originals will enable control of the grouping—this may be to allow merging of bounding boxes where there is a 10% gap, or to avoid merging bounding boxes with a 10% overlap, for example. Taking bounding boxes vii) and viii) and expanding 10% in each direction would give:

vii)' [0.90000001, 0.9, 0.9, 2.099999989, 2.1, 2.1]
viii)' [1.9, 0.9, 0.9, 3.1, 2.1, 2.1]

These altered bounding boxes now overlap and have partition identification tuples of (90, 0, 0) and (0, 0, 0). Merging the original boxes results in a single box [1, 1, 1, 3, 2, 2]. Hence, if merging bounding boxes where there is a gap of n %, the intervals are expanded by n % before assigning partition identification. If there is a numerical imprecision or tolerance, the intervals are expanded by an amount corresponding imprecision or tolerance.

The method may be carried out by a computer program, and/or by using a data processing apparatus.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer implemented method, performed by a processor of a data processing apparatus, of bounding spatial data associated with geometric bounds of an item mapped into one or more three-dimensional (3-D) axis-aligned bounding boxes, the geometric bounds bounding each permutation of all possible positions of the item geometrically, the method comprising:
   partitioning, by the processor, a set of bounding boxes using a first group of intervals along an x-axis direction and allocating a partition identification xpar;
   partitioning, by the processor, the set of bounding boxes using a second group of intervals along a y-axis direction and allocating a partition identification ypar;
   partitioning, by the processor, the set of bounding boxes using a third group of intervals along a z-axis direction and allocating a partition identification zpar; and
   partitioning, by the processor, the set of bounding boxes by partition identification tuples (xpar, ypar, zpar),
   wherein the partitioning of the set of bounding boxes along the x-axis direction, the y-axis direction, or the z-axis direction comprises:
   projecting each bounding box in the set of bounding boxes onto the respective axis direction to form a one-dimensional (1-D) interval from a 3-D axis-aligned bounding box;
   sorting the 1-D intervals either by ascending value of xmin, ymin, or zmin or descending value of xmax, ymax, or zmax; and
   scanning the 1-D intervals in ascending order or descending order and assigning the partition identification xpar, ypar, or zpar, respectively, to each 1-D interval.

2. The method of claim 1, further comprising:
   identifying, by the processor, a group of bounding boxes in the set of bounding boxes having a same partition identification tuple; and
   merging, by the processor, the identified group of bounding boxes.

3. The method of claim 2, wherein each bounding box is in a format [xmin, ymin, zmin; xmax, ymax, zmax], such that a geometric point [x, y, z] lies within a boundary of the box or on the boundary of the box when xmin≤x≤xmax, ymin≤y≤ymax, and zmin≤z≤zmax.

4. The method of claim 2, further comprising:
   additionally partitioning, by the processor, the set of bounding boxes using a same group of intervals or a different group of intervals before allocating the partition identification tuple.

5. The method of claim 4, wherein the additional partitioning is repeated until a pre-determined end point is reached.

6. The method of claim 5, wherein the pre-determined end point is either a set of space indexing goals or a set of time indexing goals or that only a single bounding box remains within the group.

7. The method of claim 2, wherein, prior to the partitioning of the set of bounding boxes using the first group of intervals, the second group of intervals, and the third group of intervals, the groups of intervals are modified to increase or decrease a number of bounding boxes having the same partition identification tuple.

8. The method of claim 7, wherein the groups of intervals are expanded, contracted, or transformed.

9. The method of claim 1, wherein the partitioning of the set of bounding boxes by partition identification tuples (xpar, ypar, zpar) comprises:
   sorting the partition identification tuples into lexicographical order.

10. The method of claim 9, wherein the bounding boxes are axis-aligned minimum bounding boxes.

11. The method of claim 10, wherein the axis-aligned minimum bounding boxes contain a minimum value of each of xmin, ymin, and zmin, and a maximum value of each of xmax, ymax, and zmax of the bounding boxes forming the group of bounding boxes having the same partition identification tuple.

12. The method of claim 1, wherein the geometric bounds are unconfigured.

13. The method of claim 12, wherein the spatial data is associated with item paths for entries in an unconfigured product index.

14. A data processing apparatus having a computer program comprising instructions, which, when the computer program is executed by a processor of the data processing apparatus, causes the data processing apparatus to:
  partition a set of bounding boxes using a first group of intervals along an x-axis direction and allocating a partition identification xpar;
  partition the set of bounding boxes using a second group of intervals along a y-axis direction and allocating a partition identification ypar;
  partition the set of bounding boxes using a third group of intervals along a z-axis direction and allocating a partition identification zpar; and
  partition the set of bounding boxes by partition identification tuples (xpar, ypar, zpar),
  wherein the partitioning of the set of bounding boxes along the x-axis direction, the y-axis direction, or the z-axis direction comprises:
    projecting each bounding box in the set of bounding boxes onto the respective axis direction to form a one-dimensional (1-D) interval from a three-dimensional (3-D) axis-aligned bounding box;
    sorting the 1-D intervals either by ascending value of xmin, ymin, or zmin or descending value of xmax, ymax, or zmax; and
    scanning the 1-D intervals in ascending order or descending order and assigning the partition identification xpar, ypar, or zpar, respectively, to each 1-D interval.

15. A data processing apparatus comprising:
a processor configured to:
  partition a set of bounding boxes using a first group of intervals along an x-axis direction and allocating a partition identification xpar;
  partition the set of bounding boxes using a second group of intervals along a y-axis direction and allocating a partition identification ypar;
  partition the set of bounding boxes using a third group of intervals along a z-axis direction and allocating a partition identification zpar; and
  partition the set of bounding boxes by partition identification tuples (xpar, ypar, zpar),
  wherein the partitioning of the set of bounding boxes along the x-axis direction, the y-axis direction, or the z-axis direction comprises:
    projecting each bounding box in the set of bounding boxes onto the respective axis direction to form a one-dimensional (1-D) interval from a three-dimensional (3-D) axis-aligned bounding box;
    sorting the 1-D intervals either by ascending value of xmin, ymin, or zmin or descending value of xmax, ymax, or zmax; and
    scanning the 1-D intervals in ascending order or descending order and assigning the partition identification xpar, ypar, or zpar, respectively, to each 1-D interval.

* * * * *